UNITED STATES PATENT OFFICE.

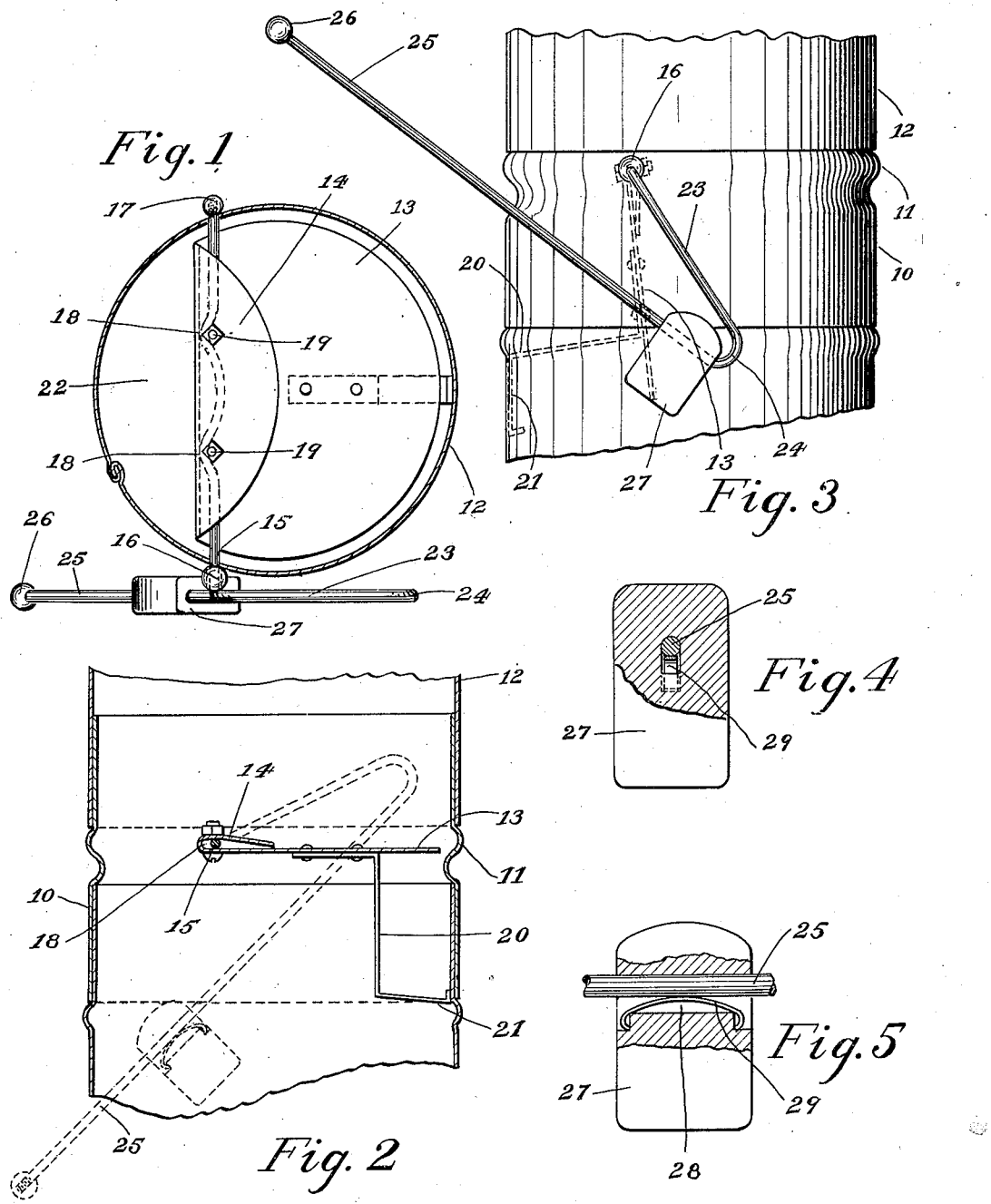

SIDNEY L. LONG, OF MINNEAPOLIS, MINNESOTA, ASSIGNOR OF ONE-HALF TO GEORGE W. McCLELLAND, OF MINNEAPOLIS, MINNESOTA.

AUTOMATIC DAMPER.

1,092,275.  Specification of Letters Patent.  Patented Apr. 7, 1914.

Application filed July 29, 1913. Serial No. 781,892.

*To all whom it may concern:*

Be it known that I, SIDNEY L. LONG, a citizen of the United States, residing at Minneapolis, in the county of Hennepin and State of Minnesota, have invented certain new and useful Improvements in Automatic Dampers, of which the following is a specification.

My invention relates to automatic dampers and has for its object to provide a damper pivoted in a pipe, so as naturally to tend to swing into open position from the force of gravity or otherwise, to provide efficient and satisfactory means for assembling the damper in the pipe, to provide means for varying the degree of force with which the damper tends to swing to open position, to provide means for limiting the swing of the damper in both directions, and to make other provisions whereby a cheap and highly efficient damper construction for the purpose is created.

The full objects and advantages of my invention will appear in connection with the detailed description thereof and are particularly pointed out in the claims.

In the drawings, illustrating the application of my invention in one form,—Figure 1 is a transverse section through a stovepipe showing a plan view of my damper when in closed position. Fig. 2 is a section through the pipe and damper at right angles to the view shown in Fig. 1. Fig. 3 is a side elevation of a stovepipe showing the position of the damper and related parts when the same is in its maximum open position. Figs. 4 and 5 are detail views of a sliding weight.

Preferably I mount my damper in a short pipe section 10 having therein a reverse corrugation 11 forming, as clearly shown in Fig. 2, a joint to be assembled in the pipe proper 12. The damper can, however, as is clearly indicated in Fig. 1, be assembled directly in the stovepipe section 12 without the employment of the short section 10. Corrugation 11 used in the short section 10 has, however, some advantage in providing a stiffened circular ring for the direct mounting of the damper which will not bend or become displaced and therefore provides the damper at all times with free swinging space.

The damper proper consists of a circular sheet of metal 13 of a size somewhat less than that of the internal diameter of the stovepipe to which the same is applied. This circular sheet is folded over at one side of the center line, as indicated at 14 in Figs. 1 and 2. A spindle 15 is provided which is inserted through apertures in the stovepipe 12 or short section 10 and is secured in position by a bearing nut or washer 16 at one side and a similar bearing nut 17 screwed to the projecting end of the spindle. This spindle is provided with a pair of bends 18. After the spindle has been inserted through the pipe the damper is placed with the folded part 14 over the spindle 15 and a pair of stove bolts 19 are passed through the two sections of the damper and within the bent portions 18 of the spindle and clamp the damper to the spindle to turn with the same, as indicated in Fig. 1. The spindle is thus at the side of the damper as same is formed so that the damper will normally tend to swing into a vertical position if the pipe extends vertical or into a horizontal position along the pipe if the pipe extends in a horizontal direction. Between the edge of the turned over lip 14 and the wall of the pipe is a space 22 which is always open for the draft of air, and this space together with the space between the curved edge of the damper and the wall of the pipe will always be so proportioned as to give the minimum amount of draft space for the furnace which is conformable to safety in the operation of the furnace.

To the side of the damper toward the furnace is secured an outwardly extended arm 20 having thereon a right-angled lip or finger 21. The finger 21 is so positioned as to engage the wall of the pipe when the damper is in closed position, as indicated in Fig. 2, and the arm 20 is of such length that when the damper is in open position, as indicated in Fig. 3, the ends of said arm will engage the opposite wall of the pipe and hold the damper at an angle or obliquely to the longitudinal extent of the pipe so that there will always be a face of the damper exposed to the current of air passing through the pipe. The member 20, 21 is therefore a device for limiting the extent of movement of the damper in both directions and for holding the damper in the proper position to be indicated by the current of air while the same is opened to the maximum extent.

The spindle 15 has secured to the protruding end thereof outside of bearing washer 16 an arm 23. This arm, which may be an integral extension of the spindle 15, is bent at right angles to the spindle 15 and at an angle to the plane of the damper proper extending obliquely away from the face of said damper and turned away from the furnace side thereof. The arm 23 is given a sharp bend at 24 and is provided with an elongated extension 25, which with the portion 23 is in a plane perpendicular to the extent of the spindle and is at a sharply acute angle or it may be parallel to the portion 23. The arm 25 has threaded on the end thereof a ball 26 serving as a stop for a weight 27 which is slidably mounted upon the arm 25. As best shown in Figs. 4 and 5, the weight 27 is provided with an aperture 28 through which extends the shank of arm 25 and within this aperture is positioned a spring member 29 which engages the arm 25 with a friction pressure thereby holding the weight 27 wherever the same may be set but permitting said weight to be readily slid from one end to the other of the arm or rod 25. The operation of this weight will be apparent. As the weight is slid toward the stop 26 on the end of arm 25 it will tend to counterbalance the weight of the damper 13 which normally causes said damper to take an open position. The nearer the stop 26 that the weight 27 is moved the more largely it will overcome the opening tendency of the damper. It is to be noted, however, that because of the oblique disposition of the arm 25 with respect to the plane of damper 13 the closing effect of the weight 27 will diminish as the damper 13 swings about its axis on spindle 15, and if the weight 27 is positioned on arm 20 at a point near and inside of the middle portion of said arm there will come a time when said weight will be swung past the vertical plane passing through spindle 15 and its influence will be exerted in the opposite direction or to effect closing of the damper. This function of my device is very important in operation. The movement of the damper to closing position is, of course, effected by the draft of air through the pipe. If this draft exceeds a certain pressure it will, through engagement with the face of the damper, swing said damper upwardly against the force of gravity tending to hold the same open. But as the damper turns a larger extent of the face thereof is subjected to the draft so that there is a tendency for the draft to effect closure at an accelerated rate as the damper approaches its closing position. In other forms of automatic dampers which have been constructed this has frequently resulted in too sudden closing of the damper, some times followed by explosion in the furnace. The weight 27 upon arm 25 has the effect of compensating for the accelerating tendency toward closure of the damper as the same swings toward closing position and is more largely exposed to the draft, the weight permitting ready movement of the damper while the same is in its fully open position with but little surface exposed to the draft and tending to retard such movement as the damper approaches its fully closing position. This prevents too sudden closing of the damper and renders the damper much more responsive in its closing effect to the draft in the stovepipe. As has already been pointed out, due to the presence of the stop arm 20, the damper never can swing into a position in which the edge only thereof is turned toward the draft. If it is desired to have a very hot fire the weight 27 will be moved into a position close to the turn 24 in which said weight unites with the weight of the damper and the arm 20 carried thereby to hold the damper in open position. If, however, the draft becomes excessive there will still be a portion of the damper exposed to said draft and the draft will tend to swing the damper into closing position. But as the damper swings upwardly the weight is swung outwardly away from the center of gravity and the force which it exerts toward holding the damper in open position progressively increases as the damper moves toward closing position and ultimately a point will be reached at which the force exerted by the draft just counterbalances the force of the weight. The draft may ultimately diminish through checking of the fire by this means when the damper will swing more to the open position. The same conditions will follow whenever the weight 27 may be positioned on the arm 25. When it is desired to have a very light fire the weight will be moved along arm 25 toward the end thereof a distance proportionate to the kind of fire which it is desired to produce. When near the end of the arm the weight will almost counterbalance the damper so that very slight pressure from draft upon the face of the damper will hold it in raised position.

The simplicity of my damper construction both in the matter of the construction itself and the cheapness with which it can be produced and in the ease of assembling in a furnace pipe will be apparent. It may be used with equal efficiency in either a vertical or horizontal furnace pipe. It may be used independently of the flanged collar piece and assembled in any furnace pipe without difficulty. It is automatic and responsive to a high degree to the draft of air passing through the stovepipe.

I claim:

1. In combination with a stovepipe, a circular damper having a fold therein at one side of its diameter, a spindle removably journaled in the stovepipe at one side of the diameter thereof, said spindle being provided with a plurality of indentations in a common plane along the length thereof, and screw bolts extending through the damper and the fold within said indentations for removably securing the damper to the spindle so that the damper is held for rotation with the spindle.

2. In combination with a stovepipe, a circular damper having a fold therein at one side of its diameter, a spindle removably journaled in the stovepipe at one side of the diameter thereof, said spindle being provided with a plurality of indentations in a common plane along the length thereof, screw bolts extending through the damper and the fold within said indentations for removably securing the damper to the spindle so that the damper is held for rotation with the spindle, and a single stop member secured to the damper and engageable with the opposite walls of the stovepipe to hold said damper in maximum closing position and in maximum open position, respectively, said stop being so extended that when the damper is in the maximum open position it will extend in a plane oblique to the elements of the stovepipe cylinder.

3. In combination with a stovepipe, a circular damper having a fold therein at one side of its diameter, a spindle removably journaled in the stovepipe at one side of the diameter thereof, said spindle being provided with a plurality of indentations in a common plane along the length thereof, screw bolts extending through the damper and the fold within said indentations for removably securing the damper to the spindle so that the damper is held for rotation with the spindle, a reversely turned arm connected with the spindle and lying in a plane perpendicular thereto, said arm extending across and obliquely to the plane of the damper, and a weight slidably mounted on the arm.

4. In combination with a stovepipe, an automatic damper comprising a spindle extending through and journaled in the stovepipe at one side of the diameter thereof, a damper within the pipe secured to rotate with said spindle, a reversely turned arm secured to the spindle outside of the pipe and extending across and obliquely to the plane of the damper, said arm at all times having a portion thereof extending across and on both sides of a plane passing through the spindle parallel with the elements of the stovepipe, and a weight slidable on said arm to either side of said plane for regulating the tendency of the damper to swing upon said spindle under the influence of gravity.

In testimony whereof I affix my signature in presence of two witnesses.

SIDNEY L. LONG.

Witnesses:
F. A. WHITELEY,
H. A. BOWMAN.

Copies of this patent may be obtained for five cents each, by addressing the "Commissioner of Patents, Washington, D. C."